United States Patent

Machida et al.

[11] Patent Number: 4,909,092
[45] Date of Patent: Mar. 20, 1990

[54] TOROIDAL TYPE INFINITELY VARIABLE TRANSMISSION

[75] Inventors: Hisashi Machida; Takaaki Shiratani, both of Maebashi; Hiroshi Suzuki, Funabashi, all of Japan

[73] Assignee: Nippon Seiko Kabushiki Kaisha, Tokyo, Japan

[21] Appl. No.: 182,357

[22] Filed: Apr. 18, 1988

[51] Int. Cl.⁴ ............................................. F16H 15/26
[52] U.S. Cl. ........................................ 74/200; 74/216
[58] Field of Search ........................... 74/199, 200, 216

[56] References Cited

U.S. PATENT DOCUMENTS

| | | | |
|---|---|---|---|
| 1,856,249 | 5/1932 | Hayes | 74/200 |
| 2,020,677 | 11/1935 | Erban | 74/200 |
| 2,619,841 | 12/1952 | Von Kreudenstein | 74/200 |
| 2,660,897 | 12/1953 | Neidhart et al. | 74/200 |
| 2,734,389 | 2/1956 | Strecker | 74/200 |
| 3,486,391 | 12/1969 | Kraus | 74/200 |
| 4,126,052 | 11/1978 | Jackman | 74/200 |

Primary Examiner—Leslie A. Braun
Assistant Examiner—Scott Anchell
Attorney, Agent, or Firm—Shapiro and Shapiro

[57] ABSTRACT

In a toroidal type infinitely variable transmission wherein power is transmitted between input and output discs by a transmission roller, the angle $\theta$ formed by the points of contact with the two discs with respect to the center of rotation of the transmission roller is set to 105° or greater. Also, the curvature ratio $R_2/R_1$ between the radius of curvature $R_2$ of the traction surface of the transmission roller and the radius of curvature $R_1$ of the toroidal surfaces of the input and output discs is 0.6 or more.

3 Claims, 5 Drawing Sheets

TOROIDAL TYPE INFINITELY VARIABLE TRANSMISSION

BACKGROUND OF THE INVENTION

1. Field of the Invention

This invention relates to a toroidal type infinitely variable transmission, and more particularly to improvements in the construction of the transmission roller of a toroidal type infinitely variable transmission for use in an agricultural machine, an industrial machine or an automotive vehicle. The invention further relates to improvements in the relation between the transmission roller and input and output discs.

2. Related Background Art

Various improvements have heretofore been made in the construction of the whole of a toroidal type infinitely variable transmission, but there has been made little or no specific and detailed study of a transmission roller's central role of power transmission and of the relation between the transmission roller and the input and output discs the transmission roller rotatively contacts.

Particularly, with regard to the opening angle formed by two straight lines passing through the two points of contact between the transmission roller and the input and output discs and the center of curvature of the traction surface of the transmission roller, there has been made substantially no attempt to specifically determine a practically effective range.

There has neither been seen any example in which consideration has been particularly paid to the relation between the curvature of the traction surface of the transmission roller and the curvature of the input and output discs, and generally, the curvatures of the two have been very approximate to each other.

SUMMARY OF THE INVENTION

Accordingly, it is an object of the present invention to provide a toroidal type infinitely variable transmission in which the traction coefficient can be maintained in its optimum condition by suppressing the spin rate and in which the life of the transmission, particularly, the bearing portion of the transmission roller thereof, can be improved.

It is another object of the present invention to provide a toroidal type infinitely variable transmission in which the value of the ratio $R_2/R_1$ of the radius of curvature $R_2$ of the traction surface of a transmission roller to the radius of curvature $R_1$ of the toroidal surfaces of input and output discs is set to a predetermined range, whereby the transmission efficiency of the transmission can be improved and the life of the contact portion and of the bearing portion of the transmission roller can be extended.

It is still another object of the present invention to provide a toroidal type infinitely variable transmission comprising an input member connected to a drive source, an output member for transmitting power to a driven member, an input disc having a toroidal surface and receiving the power transmitted from said input member, an output disc having a toroidal surface and transmitting the power to said output member, a transmission roller having a traction surface rotatively contacting the respective toroidal surfaces of said input and output discs and transmitting the power between said discs, and a trunnion rotatably supporting said transmission roller, characterized in that of the included angle $\theta$ formed at the center of curvature of the traction surface of said transmission roller by two points of contact at which said traction surface is in contact with the toroidal surfaces of said input and output discs 105° or greater.

It is yet still another object of the present invention to provid a toroidal type infinitely variable transmission comprising an input member connected to a drive source, an output member for transmitting power to a driven member, an input disc having a toroidal surface and receiving the power transmitted from said input member, an output disc having a toroidal surface and transmitting the power to said output member, a transmission roller having a traction surface rotatively contacting the respective toroidal surfaces of said input and output discs and transmitting the power between said discs, and a trunnion rotatably supporting said transmission roller, characterized in that said toroidal surfaces of said input and output discs have the same radius of curvature $R_1$, the radius of curvature of the traction surface of said transmission roller is $R_2$, and there is the following relation between $R_1$ and $R_2$:

$$R_2 R_1 \geqq 0.6.$$

DESCRIPTION OF THE PREFERRED EMBODIMENTS

Before some embodiments of the present invention are described, description will hereinafter be made of the opening angle $\theta$ and the curvature ratio $R_2/R_1$ of a transmission roller according to the present invention.

In traction drive type transmissions, including toroidal type infinitely variable transmissions, the maximum traction coefficient is an important parameter in determining the performance, life and size of the apparatus. Here, the traction coefficient will be described briefly. When two transmission members having smooth surfaces rotatively contact each other, the tangential force (the traction force) applied to the surface of contact, i.e., the traction surface, is proportional to the contact normal force applied to the surface of contact. The proportion constant is called the traction coefficient. That is, the traction coefficient is represented by the following relation:

$$\text{Traction coefficient} = \frac{\text{Traction force}}{\text{Contact normal force}}$$

Also, the value of this traction coefficient differs depending on the traction oil used, but herein, for convenience of description, it is to be understood that the same traction oil is used.

According to the inventor's positive study, it has been found that there is a practically effective range of the opening angle of a transmission roller.

Assuming that this opening angle is $\theta$, the range it may assume is $0° < \theta \leq 180°$ in design. However, if this opening angle $\theta$ is small, e.g. 100° or less, the spin rate is reduced and slip decreases, and it is necessary to make the PCD of the transmission roller (PCD is the size of the diameter of an annular groove for holding the steel balls of the bearing, for example, the thrust bearing, of the transmission roller.) As a result, the rated load of the bearing portion of the transmission roller decreases and further, since the value of $\theta$ is small, the thrust load applied to the bearing portion of the transmission roller increases and the life of the bearing is reduced.

When the opening angle $\theta$ is greater than 100°, the thrust load applied to the bearing portion of the transmission roller decreases. Indeed, when $\theta = 180°$, the thrust load of the bearing portion of the transmission roller becomes almost zero. However, as the value of $\theta$ becomes great, the spin rate in the portion of contact between the traction surface and the toroidal surface increases, that is, the portion of contact becomes liable to slip and the traction coefficient in the portion of contact is reduced. As a result, the transmission efficiency of the transmission is reduced, and an excessively great pressure force becomes necessary to increase the traction coefficient leads to increased contact surface pressure in the portion of contact and reduced life of the transmission.

Figure 3:
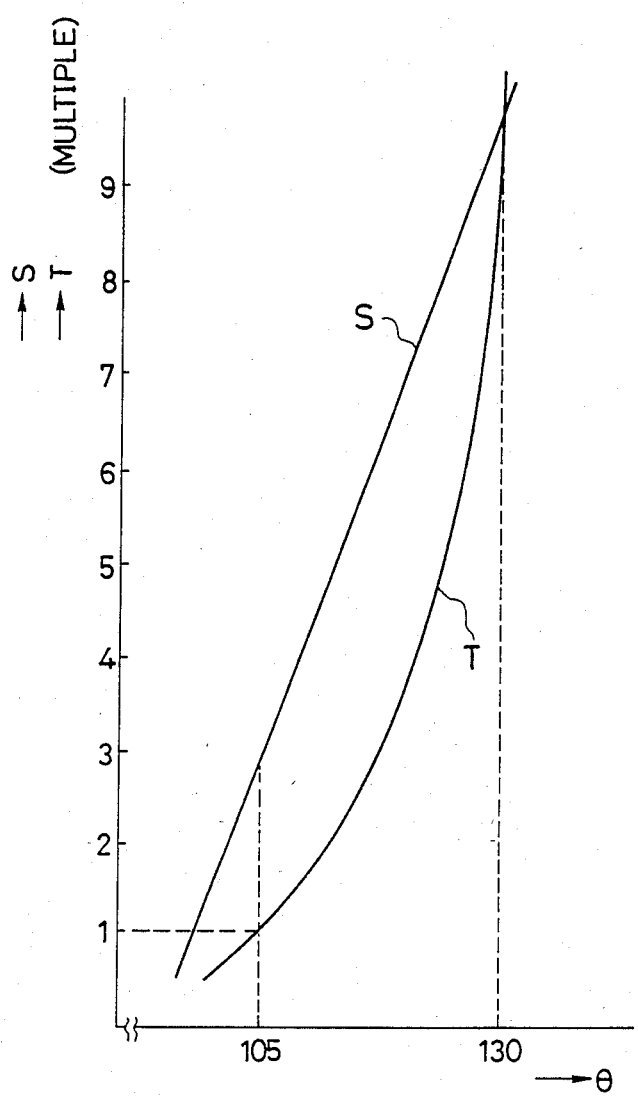
FIG. 3 is a graph showing the correlation among the opening angle $\theta$, the spin rate S and the lifetime T.

The above-described result is shown in the graph of FIG. 3. As shown in this graph, for the opening angle $\theta$ of 105° or less, the spin rate S is small, but the life T of the bearing of the transmission roller and the transmission becomes small, and this is unsuitable in practice. Also, if the opening angle $\theta$ is 130° or greater, the life T increases while, at the same time, the spin rate S increases. This leads to the tendency for the portion of contact becomes to slip (the traction coefficient decreases) and an excessively great pressure force becomes necessary. Accordingly, it is preferable that the opening angle $\theta$ be set to equal to or greater than 105° and equal to or less than 130°. In the graph of FIG. 3, the scale of the vertical axis is common to both of the spin rate S and the life time T.

Figure 5:
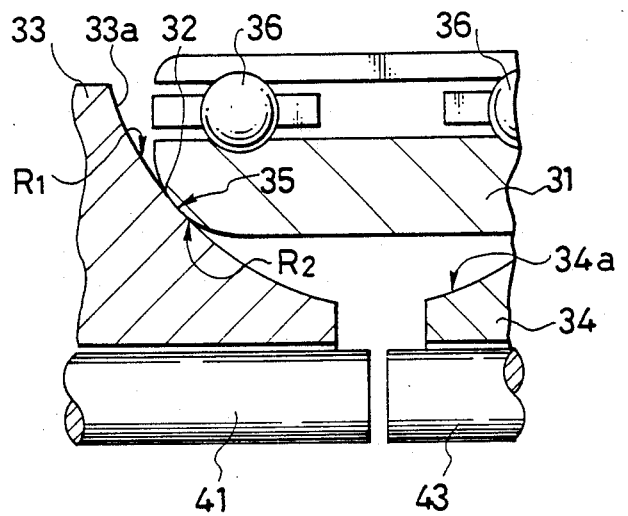
FIG. 5 is a fragmentary cross-sectional view showing a second embodiment of the present invention and also showing the relation between the curvatures of the traction surface of the transmission roller and the toroidal surface of the input disc.
Figure 6:
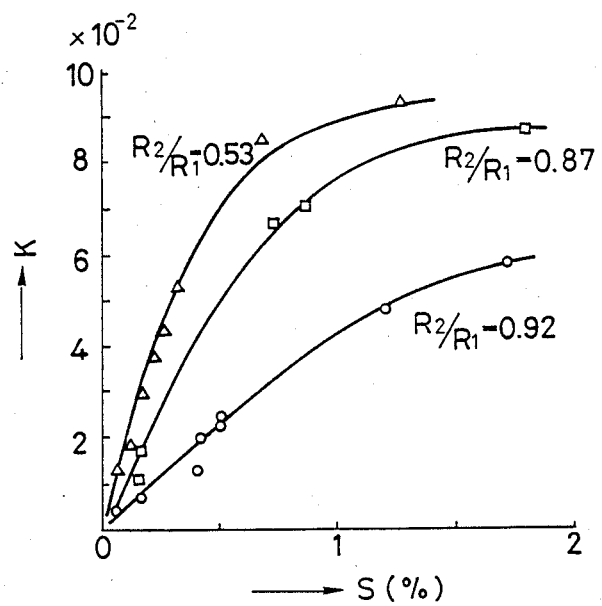
FIG. 6 is a graph showing the relation among the traction coefficient, the slip rate and the curvature ratio.
Figure 7:
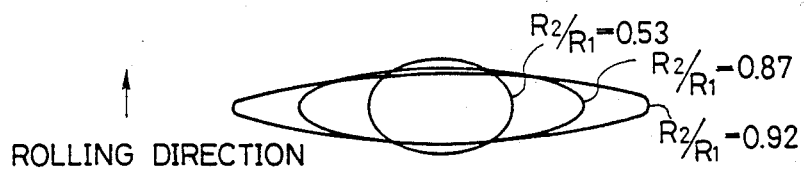
FIG. 7 is a graph showing the relation between the shape of the surface of contact and the curvature ratio.

As will be appreciated from FIGS. 5 and 6, it has been found that in a toroidal type infinitely variable transmission, there are the following correlations between the radius of curvature $R_2$ of a surface perpendicular to the rolling direction of the traction surface 32 of a transmission roller 31 and the radius of curvature $R_1$ of the toroidal surfaces of an input disc 33 and an output disc 34:

(a) When $R_2$ is sufficiently small relative to $R_1$, for example, when the curvature ratio $R_2/R_1 = 0.53$, the shape of the surface of contact 35 between transmission roller 31 and each of the input disc 33 and the output disc 34 is substantially a true circle (see FIG. 7), and the pressure of the surface of contact becomes high. This results in rolling fatigue and reduced life of the portion of contact and exfoliation on the surface of contact.

Figure 8:
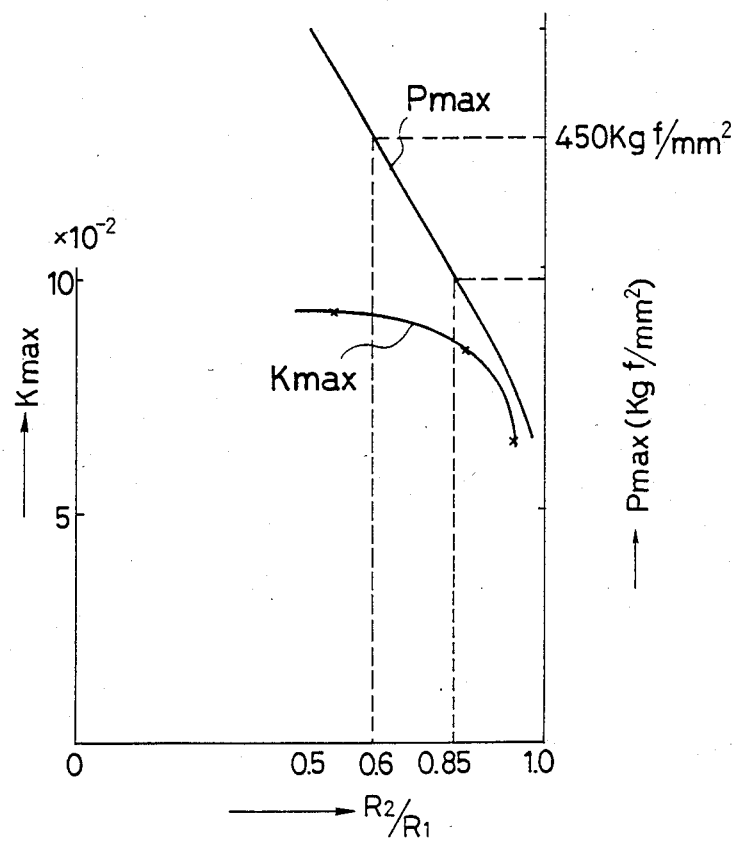
FIG. 8 is a graph showing the relation among the maximum value of the traction coefficient, the contact surface pressure and the curvature ratio.

(b) When $R_2$ is very close to $R_1$, for example, when the curvature ratio $R_2/R_1 = 0.87$, the shape of the surface of contact 35 is an ellipse shorter in the rolling direction (see FIG. 7), and the pressure of the surface of contact is reduced. However, since the loss in the interior of the surface of contact 35 becomes great, the maximum value of the traction coefficient K (the coefficient of rolling friction when an oil film is used) is reduced as seen in FIG. 8. Therefore, a greater axial pressure force is required and friction loss increases in the bearing portion 36 of the transmission roller 31. When $R_1$ becomes closer to $R_2$, for example, when the curvature ratio $R_2 R_1 = 0.92$, the shape of the surface of contact 35 becomes an oval (see FIG. 7), and the maximum value of the traction coefficient is further reduced as seen in FIG. 8. Accordingly, as compared with the case where the curvature ratio $R_2/R_1 = 0.87$, still a greater pressure force becomes necessary.

As can be seen from the relation between the traction coefficient K and the slip rate S in each curvature ratio shown in FIG. 6, the inclination of the curve differs for each curvature ratio. If an attempt is made to obtain a given traction coefficient K, great slip occurs for a curvature ratio $R_2/R_1$ of about 0.85 or more, and this may result in reduced transmission efficiency. Therefore, it is preferable to control this curvature ratio to less than 0.85 if possible.

Some embodiments of the present invention will hereinafter be described with reference to the drawings.

Figure 2:
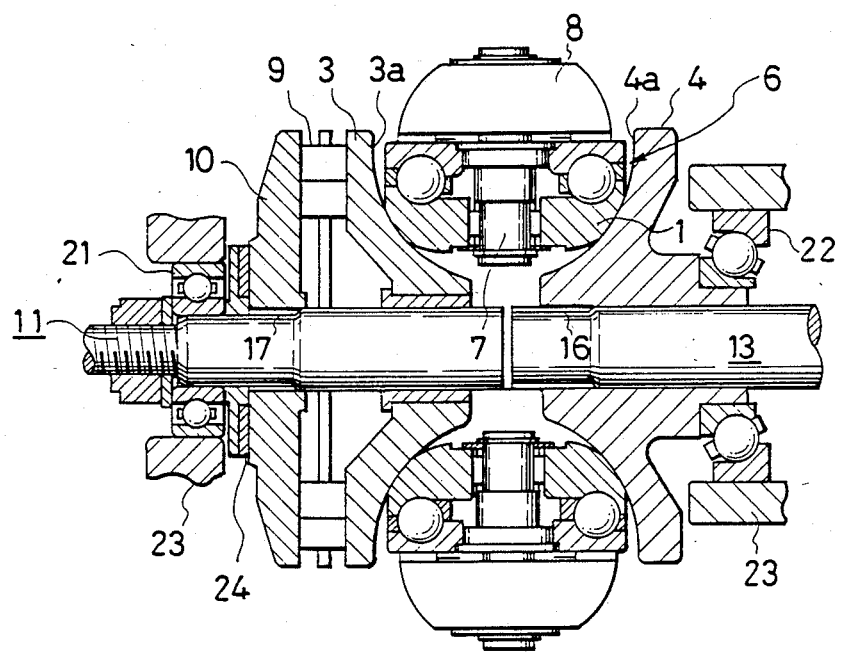
FIG. 2 is a longitudinal cross-sectional view of a toroidal type infinitely variable transmission to which first and second embodiments of the present invention are applicable.

With reference to FIG. 2, description will first be made of the basic construction and operation of a toroidal type infinitely variable transmission to which each embodiment of the present invention is applicable.

An annular input disc 3 is rotatably fitted on an input shaft 11 connected to a drive source, not shown, such as an engine. The input disc 3 has a toroidal surface 3a, and on the side opposite to the toroidal surface, an annular cam 9 is disposed through the input shaft 11 and is in contact with a cam disc 10. The input shaft 11 is rotatably fixed to a housing 23 through a bearing 21, and an annular counter-sunk spring 24 is fitted on the input shaft 11 to impart predetermined pre-pressure to a power transmitting portion. The annular cam disc 10 is fitted on the input shaft 11 through a spline 17, and the two are not rotatable relative to each other. However, the cam disc 10 is axially slidable and with the cam 9, it constitutes a cam device and imparts an axial pressure force to the input disc 3. Accordingly, the rotational power of the input shaft 11 is transmitted to the input disc 3 by the meshing engagement of the cam 9 therewith. The input disc 3 is thus rotated, whereby a transmission roller 1 which is in contact with the toroidal surface 3a thereof is rotated by the traction force. This transmission roller 1 is rotatably supported on a trunnion 8.

The rotational force of the transmission roller 1 is transmitted to an annular output disc 4 by the roller 1 contacting the toroidal surface 4a of the output disc 4. Since this output disc 4 is fitted on an output shaft 13 through a spline 16 against relative rotation, the power transmitted to the output disc 4 directly porvides the power of the output shaft 13. The output shaft 13 is rotatably fixed to the housing 23 through a bearing 22 and is connected to a driven member, not shown. With the above-described construction and operation, when the transmission roller 1 is inclined, speed is changed and power transmission is effected.

In the toroidal type infinitely variable transmission shown in FIG. 2, the input shaft and the output shaft are separate and disposed coaxially with each other. Alternatively the input and output discs may both be fitted on a single through-shaft and with the through-shaft as the input shaft or the output shaft, the input or output shaft may be connected to the input and output discs or the cam device. A construction is also possible in which the input and output shafts are in the opposite relation with respect to the cam device, that is, the reference numeral 11 designates the output shaft and the reference numeral 13 denotes the input shaft.

Figure 1:
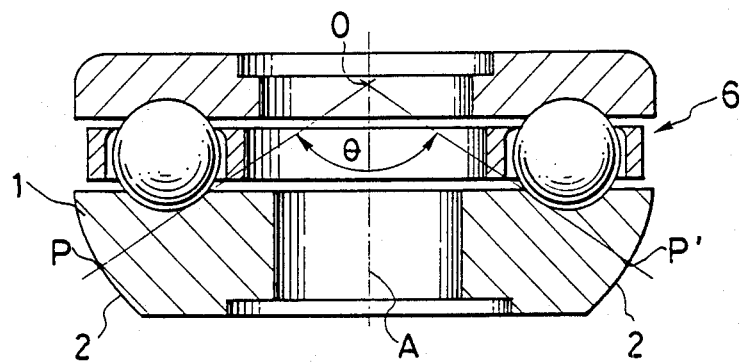
FIG. 1 is a cross-sectional view showing the transmission roller side a first embodiment of the present invention.

A first embodiment of the present invention will now be described in detail with reference to FIG. 1. In FIG. 1, portions identical to those in FIG. 2 are given identical reference numerals.

The transmission roller 1 has a traction surface 2 that rotatively contacts the toroidal surfaces 3a and 4a of the input and output discs 3 and 4, not shown in FIG. 1. The curvature of the traction surface 2 is of a predetermined value. The traction surface 2 is in rotative contact with the toroidal surface 3a of the input disc 3 and the toroidal surface 4a of the output disc 4 at points of contact P and P', respectively.

The center O of the curvature of the traction surface 2 is on the axis A of the pivot shaft 7 of the trunnion 8 (see FIG. 2), the trunnion 8 rotatably supporting the transmission roller 1 by its pivot shaft 7. The angle formed at the center O of the curvature by two straight segments OP and OP' extending between the center O of the curvature and the points of contact P and P' is defined as $\theta$.

The opening angle $\theta$ may assume a value of $0° < \theta 180°$ in design, but with the already described problems taken into account, in the present invention, the value of the opening angle $\theta$ is set to 105° or greater. To optimize the relation between the spin rate S and the life T as shown in FIG. 3, the angle $\theta$ may be set to equal to or greater than 105° and equal to or less than 130°.

That is, as can be seen from FIG. 3, if the opening angle $\theta$ is 105° or less, the life T will become shorter than multiple (the minimum one endurance time of the transmission for a light automobile). Clearly, it cannot be a practical design to set the opening angle so that the life time is as short as one multiple or less.

Figure 4:
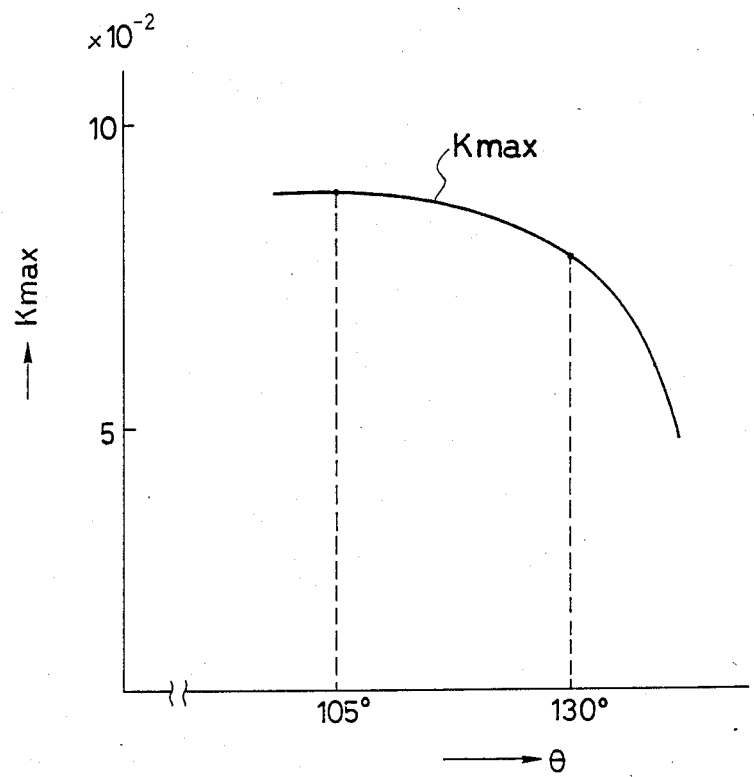
FIG. 4 is a graph showing the relation between the maximum value of the traction coefficient and the opening angle.

Also, if the opening angle $\theta$ is 130° or greater, the spin rate S will be as great as nine times or more than at an angle of 105%. Thus, the slip at the points of contact increases and the maximum value of the traction coefficient sharply decreases. This becomes apparent from FIG. 4, which shows the relation between the maximum value Kmax of the traction coefficient and the opening angle $\theta$, and does not admit of a practical design for many applications.

When the transmission roller 1 tilts between the input and output discs 3 and 4 to change the transmission gear ratio, the points of contact change their positions and therefore the opening angle $\theta$ varies slightly, but even in such case, the opening angle has not greatly deviated from the above-mentioned range.

With the opening angle $\theta$ thus appropriately set the thrust load applied to the bearing 6 of the transmission roller 1 does not increase more than necessary and the transmission roller can rotate stably.

A second embodiment of the present invention will now be described. The second embodiment is the same as the first embodiment in the basic construction.

As shown in FIG. 5, a transmission roller 31 is in rotative contact with the toroidal surfaces 33a and 34a of input and output discs 33 and 34 by its traction surface 32. The relation between the radius of curvature $R_2$ of the traction surface 32 and the radius of curvature $R_1$ of the toroidal surfaces 33a and 34a is set so that the curvature ratio $R_2/R_1$ is 0.6 or more, but it may preferably be set so that the curvature ratio is equal to or greater than 0.6 and equal to or less than 0.85. The curvatures of the toroidal surfaces 33a and 34a are identical to each other, and the surface of contact 35 on which the traction surface 32 contacts the toroidal surfaces 33a and 34a changes its position with the inclination of the transmission roller. therefore, the toroidal surfaces 33a and 34a are designed so as to have a predetermined radius of curvature $R_1$ in any position within the range over which the transmission roller 31 moves while keeping rotative contact so that the curvature ratio $R_2/R_1$ between the radius of curvature $R_2$ of the traction surface 32 on the surface of contact 35 and the radius of curvature $R_1$ of the toroidal surfaces 33a and 34a assumes a predetermined value. The reference numeral 36 designates a bearing for rotatably supporting the transmission roller 31.

Referring now to FIG. 8, for a curvature ratio of 0.6 or less, the contact surface pressure Pmax on the surface of contact 35 becomes too high as already described. More specifically, the rolling fatigue life is reduced by 450 Kg.f/mm$^2$ or more and it becomes impractical for such a transmission to be used in an actual vehicle or the like.

Also, if the curvature ratio is 0.8 or more, the shape of the surface of contact becomes an ellipse shorter in the rolling direction. As the distance of the surface of contact from the axis of rotation becomes greater, that is, as the shape of the surface of contact becomes more oval, the slip loss in the surface of contact becomes greater and heat generation results in a reduction in the maximum value Kmax of the traction coefficient. That is, if the curvature ratio $R_2/R_1$ exceeds 0.85 as shown in FIG. 8, the maximum value Kmax of the traction coefficient descreases sharply and a great pressure force becomes necessary to increase the traction coefficient.

Accordingly, as described above, in the second embodiment, the curvature ratio $R_2/R_1$ is set to 0.6 or more. However, if the curvature ratio $R_2/R_1$ becomes 0.85 or more, a great pressure force becomes necessary and therefore, it is preferable that $R_2/R_1$ be set to greater than 0.6 and less than 0.85.

As described above, the toroidal type infinitely variable transmission according to the present invention has the following effects.

Since the opening angle of the transmission roller is set properly, there is no reduction in the traction coefficient resulting from an increase in the spin rate. Therefore, the transmission efficiency becomes better, and the surface pressure in the portion of contact between the transmission roller and the input and output discs can be minimized and the pressure force can be made small. Further, the life of the transmission is extended and stable power transmission can be accomplished.

Also, the fact that the thrust load applied to the bearing of the transmission roller is sufficiently small leads to a longer life of the bearing.

Since the curvature ratio between the traction surface of the transmission roller and the toroidal surfaces of the input and output discs is set optimally, the contact surface pressure is small and the rolling fatigue life is extended.

Also, since the maximum value of the traction coefficient is set optimally, the axial pressure force can be made small. Accordingly, the load applied to the bearing portion of the transmission roller and the bearings or the like of the input and output shafts can be reduced, and this leads to a decrease in torque loss which in turn leads to improved efficiency as a transmission and increased life of the bearings.

Further, since the curvature ratio is set so as to be within a predetermined range a given traction coefficient may be obtained with only a small slip rate.

As a secondary, but significant advantage, the invention achieves compactness of the apparatus due to the reduction in the pressure force.

We claim:

1. A toroidal type infinitely variable transmission comprising an input member connected to a drive source, an output member for transmitting power to a driven member, an input disc having a toroidal surface and receiving the power transmitted from said input member, an output disc having a toroidal surface and transmitting the power to said output member, a transmission roller having a traction surface rotatively contacting the respective toroidal surfaces of said input and output discs and transmitting the power between said discs, and a trunnion rotatably supporting said transmission roller, said transmission roller being tiltable with said trunnion relative to said input and output discs for contacting said toroidal surfaces within a predetermined range of positions, characterized in that said toroidal surfaces of said input and output discs have respective axial cross-sectional contours with the same predetermined radius of curvature $R_1$ over said predetermined range of positions, the axial cross-sectional contour of the traction surface of said transmission roller has a predetermined radius of curvature $R_2$ and a center of curvature situated at a point on the rolling axis of said transmission roller, and there is the following relation between $R_1$ and $R_2$:

$$0.6 \leq R_2 R_1 \leq 0.85.$$

2. A toroidal type infinitely variable transmission according to claim 1, characterized in that respective points of contact of said traction surface with the toroidal surfaces of said input and output discs define an angle $\theta$ of 105° or greater with a vertex at said center of curvature of said traction surface.

3. A toroidal type infinitely variable transmission according to claim 2, characterized in that said angle $\theta$ is $105° \leq \theta \leq 130°$.

* * * * *

UNITED STATES PATENT AND TRADEMARK OFFICE
CERTIFICATE OF CORRECTION

PATENT NO. : 4,909,092

DATED : March 20, 1990

INVENTOR(S) : Hisashi Machida, et al

It is certified that error appears in the above-identified patent and that said Letters Patent is hereby corrected as shown below:

In column 2, line 24, change "$R_2R_1 \geq 0.6$" to --$R_2/R_1 \geq 0.6$--.

In column 4, line 17, change "$R_2R_1 = 0.92$" to --$R_2/R_1 = 0.92$--;

line 28, change "$R_{2/R_1}$" to --$R_2/R_1$--.

In column 5, line 37, change "$0° < \theta 180°$" to --$0° < \theta \leq 180°$--;

line 52, change "105%" to --105°--.

UNITED STATES PATENT AND TRADEMARK OFFICE
CERTIFICATE OF CORRECTION

PATENT NO. : 4,909,092

DATED : March 20, 1990

INVENTOR(S) : Hisashi Machida, et al

It is certified that error appears in the above-identified patent and that said Letters Patent is hereby corrected as shown below:

In column 8, line 18, change "$0.6 \leq R_2R_1 \leq 0.85$" to --$0.6 \leq R_2/R_1 \leq 0.85$--.

Signed and Sealed this

Nineteenth Day of November, 1991

Attest:

HARRY F. MANBECK, JR.

*Attesting Officer*     *Commissioner of Patents and Trademarks*